United States Patent
Han et al.

(10) Patent No.: US 10,860,875 B2
(45) Date of Patent: Dec. 8, 2020

(54) DEVICE AND METHOD TO REGISTER USER

(71) Applicant: Samsung Electronics Co., Ltd., Suwon-si (KR)

(72) Inventors: Seungju Han, Seoul (KR); Minsu Ko, Suwon-si (KR); Chang Kyu Choi, Seongnam-si (KR); Jaejoon Han, Seoul (KR); Wonsuk Chang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 16/133,976

(22) Filed: Sep. 18, 2018

(65) Prior Publication Data

US 2019/0180128 A1 Jun. 13, 2019

(30) Foreign Application Priority Data

Dec. 12, 2017 (KR) .......... 10-2017-0170753

(51) Int. Cl.
 *G06K 9/00* (2006.01)
(52) U.S. Cl.
 CPC ..... *G06K 9/00926* (2013.01); *G06K 9/00288* (2013.01); *G06K 9/00617* (2013.01)

(58) Field of Classification Search
 CPC .......... G06K 9/00926; G06K 9/00617; G06K 9/00288
 See application file for complete search history.

(56) References Cited

U.S. PATENT DOCUMENTS

| | | | |
|---|---|---|---|
| 2015/0139492 A1* | 5/2015 | Murakami | G06K 9/00268 382/103 |
| 2017/0132408 A1 | 5/2017 | Kim et al. | |
| 2017/0200043 A1* | 7/2017 | Wu | G06K 9/00926 |

FOREIGN PATENT DOCUMENTS

| | | |
|---|---|---|
| JP | 4883987 B2 | 2/2012 |
| JP | 5261009 B2 | 8/2013 |
| JP | 6096161 B2 | 3/2017 |
| KR | 10-1242390 B1 | 3/2013 |
| KR | 10-1714350 B1 | 3/2017 |

* cited by examiner

*Primary Examiner* — Dhaval V Patel
(74) *Attorney, Agent, or Firm* — NSIP Law

(57) ABSTRACT

A user registration device and method is disclosed. The user registration device compares an initial image stored in a database and a newly input candidate image, and determines whether to generate and manage an additional database based on the similarity between the initial image and the candidate image.

22 Claims, 11 Drawing Sheets

DEVICE AND METHOD TO REGISTER USER

CROSS-REFERENCE TO RELATED APPLICATIONS

This application claims the benefit under 35 USC § 119(a) of Korean Patent Application No. 10-2017-0170753 filed on Dec. 12, 2017, in the Korean Intellectual Property Office, the entire disclosure of which is incorporated herein by reference for all purposes.

BACKGROUND

1. Field

The following description relates to registering a user for user recognition.

2. Description of Related Art

Various mobile or wearable devices such as, for example, smartphones, use biometric information. The biometric information includes information such as, for example, a fingerprint, an iris, a voice, a face, and blood vessels of a user for security authentication. In one example of security authentication where facial recognition method is performed by comparing an input face image to an initially registered single face image may not suffice because of makeup, hairstyle, beard, weight, and other changes to a user's facial features over time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a user registration method including obtaining a candidate image corresponding to a user, in response to an additional registration command, and adding the candidate image to an additional database, in response to the candidate image and the additional database corresponding to the additional registration command indicating a same object.

The user registration method may include obtaining at least one of biometric data or a user input from the user, and generating the additional registration command, in response to the at least one of the biometric data being recognized or the user input being valid.

The user registration method may include obtaining an input image of the user and an input iris image of the user, and generating the additional registration command, in response to the input iris image matching a registered iris image, wherein the obtaining of the candidate image may include determining the input image corresponding to the input iris image to be the candidate image, in response to the additional registration command being generated.

The user registration method may include providing an interface recommending additional registration, in response to user recognition failing for more than a threshold number of times or more, and generating the additional registration command, in response to a user input being received through the interface.

The providing of the interface recommending the additional registration may include identifying an attribute causing the user recognition to fail, and providing an interface recommending generation of an additional database for the identified attribute.

The user registration method may include generating the additional database corresponding to the additional registration command, in response to the additional database corresponding to the additional registration command being absent and the candidate image and an initial image stored in an initial database being similar to each other.

The adding of the candidate image may include calculating a matching score by comparing the candidate image and an additional registered image stored in the additional database, and determining whether to add the candidate image to the additional database based on the matching score.

The determining of whether to add the candidate image to the additional database may include adding the candidate image to the additional database, in response to the matching score being in a reference range, and determining that the candidate image and the additional registered image are not similar to each other, in response to the matching score being out of the reference range.

The obtaining of the candidate image may include obtaining an input image comprising images of an object corresponding to the user, and selecting the candidate image from the input image.

The generating of the additional database may include calculating a matching score by comparing the candidate image and the initial image stored in the initial database, and determining whether to generate the additional database corresponding to the candidate image based on the matching score.

The determining of whether to generate the additional database may include generating the additional database comprising the candidate image, in response to the matching score exceeding a reference threshold, and determining that the candidate image indicates an object different from an object indicated by the initial database, in response to the matching score being less than or equal to the reference threshold.

The calculating of the matching score may include extracting, from the candidate image, feature data corresponding to the candidate image, extracting, from the initial database, feature data corresponding to the initial image, and calculating a similarity between the feature data corresponding to the candidate image and the feature data corresponding to the initial image.

The user registration method may include determining attribute information of the candidate image, wherein the generating of the additional database may include generating a database in which the attribute information of the candidate image is mapped.

The adding of the candidate image may include comparing the candidate image and an attribute image stored in an attribute database, in response to the attribute database corresponding to the attribute information being present, and adding the candidate image to the attribute database, in response to the candidate image and the attribute image being similar.

The user registration method may include selecting an attribute database from the plurality of attribute databases, in response to a presence of the plurality of attribute databases, comparing the candidate image and an attribute image stored in the selected attribute database, adding the candidate image to the selected attribute database, in response to the candidate image and the attribute image being similar, and determining whether to add the candidate image to a remaining attribute database of the plurality of attribute databases.

The comparing of the candidate image and the attribute image may include increasing a minimum threshold to compare the candidate image and the attribute image, in response to the attribute information of the candidate image and attribute information of the attribute image being the same, and decreasing the minimum threshold to compare the candidate image and the attribute image, in response to the attribute information of the candidate image and the attribute information of the attribute image being different from each other.

The user registration method may include performing user recognition based on an input image of the user, and updating the initial database with the candidate image, in response to the candidate image selected from the input image being similar to an initial image stored in an initial database.

The adding of the candidate image may include adding the candidate image to the additional database, in response to a number of additional registered images stored in the additional database being less than a maximum number.

In another general aspect, there is provided a user registration device including an image acquirer configured to obtain a candidate image corresponding to a user, in response to an additional registration command, a processor configured to add the candidate image to an additional database corresponding to the additional registration command, in response to the candidate image and the additional database indicating a same object, and a memory configured to store the additional database.

In another general aspect, there is provided a user registration method including obtaining a candidate image based on capturing a portion of a user, in response to an additional registration command, extracting feature data from the candidate image, calculating, based on the feature data, a matching score between the candidate image and a registered image, in response to a presence of an additional database including the registered image, and adding the candidate image to the additional database, in response to the matching score being greater than a minimum threshold and lesser than a maximum threshold.

The additional database may correspond to an attribute of the candidate image.

The user registration method may include generating the additional registration command, in response to a pattern input by a user matching a registered pattern.

The adding of the candidate image to the additional database may include adding the candidate image to the additional database, in response to a number of images registered in the additional database being less than a threshold.

Other features and aspects will be apparent from the following detailed description, the drawings, and the claims.

Figure 1:
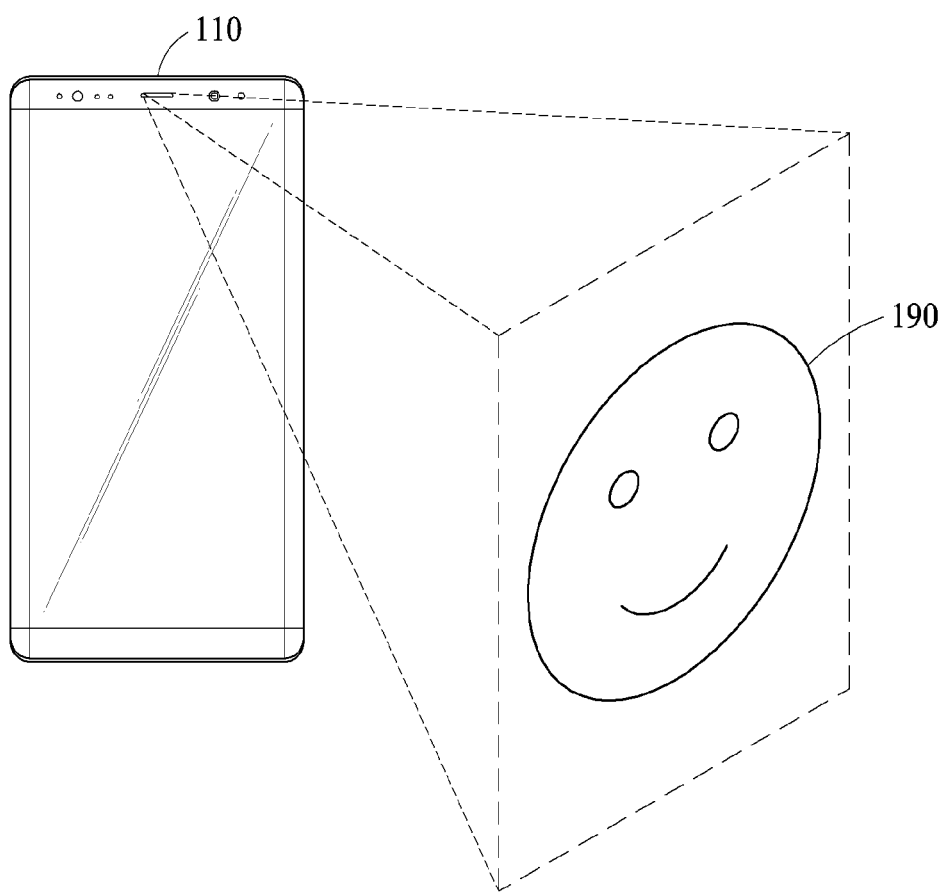
FIG. 1 is a diagram illustrating an example of a user registration device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

Also, in the description of embodiments, detailed description of well-known related structures or functions will be omitted when it is deemed that such description will be redundant or cause ambiguous interpretation of the present disclosure.

FIG. 1 is a diagram illustrating an example of a user registration device. In an example, the user registration device disclosed herein may be implemented in various types of electronic devices, such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, personal computers (PC), laptop computers, tablet computers, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, televisions (TVs), a high definition television (HDTV), a smart home system, a smart appliance, a smart home appliance such as a smart speaker, a smart television (TV), a smart refrigerator or a smart lamp, or a smart vehicle, an intelligent vehicle, kiosks, a biometrics-based door lock, a security device, a financial service device, communication systems, an automated teller machine (ATM), image processing systems, graphics processing systems, various Internet of Things (IoT) devices that are controlled through a network, a smart vehicle, or other consumer electronics/information technology (CE/IT) device.

Referring to FIG. 1, a user registration device 110 recognizes a user using registered information. For example, as illustrated, the user registration device 110 captures an image of an object 190 corresponding to the user, and determines whether the user is a registered user or not using the captured image.

The object 190 may be at least a portion of a body that may indicate an identity of the user. For example, the object 190 is a face of the user. The captured image of the object 190, or also referred to herein as an object image, may be an image including at least a portion of the face of the user, but not limited thereto.

In an example, the user registration device 110 stores information needed to recognize the user in a database in advance. The database is stored in a memory of the user registration device 110. For example, the user registration device 110 may register the object image in the database, or data obtained by converting the object image, for example, feature data, in the database.

In an example, the user registration device 110 manages a plurality of databases for a same user to recognize the user in different environments. For example, the user registration device 110 may store, in the memory, a database of the same user in a bright environment and a database of the same user in a dark environment. Hereinafter, how the user registration device 110 generates and manages databases to accurately recognize a user even in various environments will be described in detail.

Figure 2:
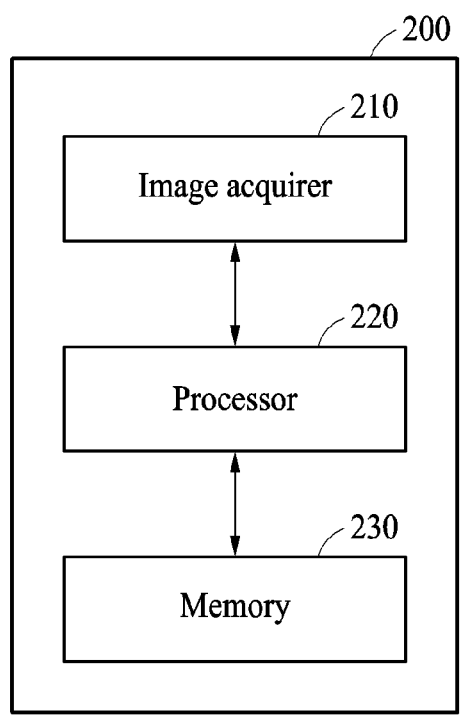
FIG. 2 is a diagram illustrating an example of a configuration of a user registration device.

FIG. 2 is a diagram illustrating an example of a configuration of a user registration device. Referring to FIG. 2, a user registration device 200 includes an image acquirer 210, a processor 220, and a memory 230.

In an example, the image acquirer 210 obtains a candidate image from a user in response to an additional registration command. In an example, the additional registration command is a command for generating, in the memory 230, an additional database that is distinguishable from the initial database when the initial database indicates that the user is present. In another example, the additional registration command is a command for storing an additional image in the additional database to register the additional image. The additional image may also be referred to herein as an additional registered image. The candidate image may be an object image, which is a candidate to be registered in the additional database. In an example, the image acquirer 210 obtains, as the candidate image, a color image, a depth image, or an image in which both images are combined. In an example, the image acquirer 210 may include, for example, a camera sensor and a depth sensor. However, the image acquirer 210 is not limited to the examples described in the foregoing, and thus various sensors and sensing images may also be used.

The additional image or the additional registered image refers to an image registered in the additional database. In an example, the additional registered image may be registered in a form of feature data in the additional database.

In an example, the processor 220 adds the candidate image to the additional database when the candidate image and the additional database corresponding to the additional registration command indicate a same object. In another example, the processor 220 generates the additional database when the additional database corresponding to the candidate image is not present and the candidate image and the initial database indicate a same object.

The memory 230 stores the additional database. The initial database refers to a database that is initially generated for the user, and the additional database refers to a database that generated in addition to the initial database.

Hereinafter, the generation and management of an additional database will be described in detail.

Figure 3:
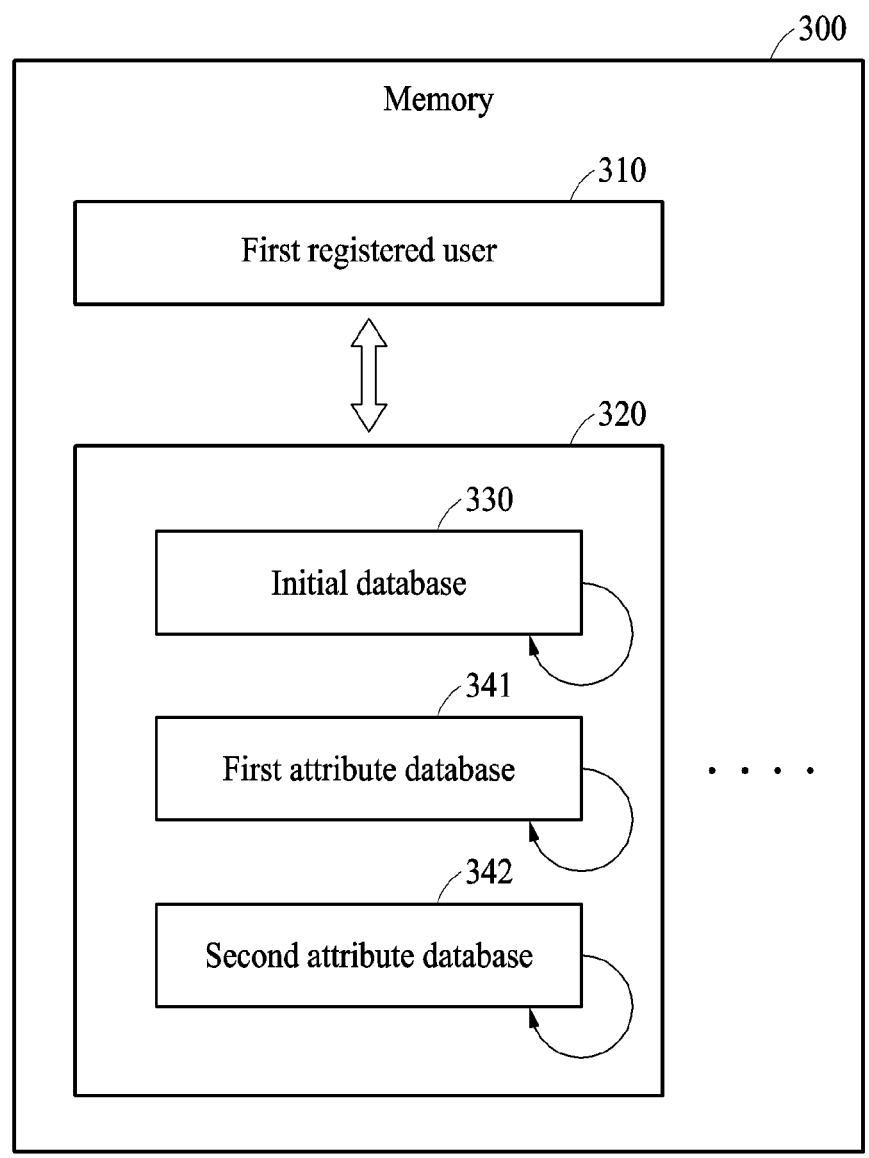
FIG. 3 is a diagram illustrating an example of a configuration of a memory included in a user registration device.

FIG. 3 is a diagram illustrating an example of a configuration of a memory included in a user registration device.

Referring to FIG. 3, a processor stores a database corresponding to a user in a memory 300. For example, the processor may map user information indicating the user and database corresponding to the user information, and store the mapped database in the memory 300. The user information refers to information indicating the user and includes information, such as, for example, a name, and a nickname of the user. In the example illustrated in FIG. 3, a database 320 corresponds to a first registered user 310. Although FIG. 3 illustrates only the first registered user 310, the number of users is not limited thereto, and thus the memory 300 may store a database corresponding to each of the registered users.

The database 320 corresponding to the first registered user 310 includes a plurality of databases, for example, an initial database 330 and an additional database.

The initial database 330 is a database initially generated for the user. The initial database 330 may include at least one of an image initially input by the user or feature data corresponding to the image.

The additional database is a database generated after the initial database 330 is generated. The processor maps attribute information in the additional database, and stores the mapped additional database in the memory 330. The additional database in which the attribute information is mapped is also referred to herein as an attribute database. For example, as illustrated, a first attribute database 341 is a database in which a first attribute is mapped, and a second attribute database 342 is a database in which a second attribute is mapped.

The attribute information refers to information indicating an attribute of an object image. The attribute indicates information such as, for example, a state of an object, and a state around the object. For example, the attribute information may indicate information associated with an ambient brightness as an environment in which the object image is captured. For example, the attribute information of the object image may include an attribute, such as, for example, brightness, indicating that an environment around an object is bright in the object image. Also, the attribution information of the object image may also include an attribute, for example, darkness, indicating that the environment around the object is dark in the object image. In addition, the attribute information may include, for example, an accessory attribute when the user wears an accessory, such as, for example, eyeglasses, hearing aids, a makeup attribute when the user wears a makeup.

After the initial database 330 and the additional database are completed, the processor updates the initial database 330 and the additional database using an input image collected during user recognition. For example, when the collected input image is determined to be suitable to be registered in a particular database, the processor may replace an image already registered in the initial database 330 or the additional database with the input image.

Hereinafter, how an additional database is generated and managed will be described in detail.

Figure 4:
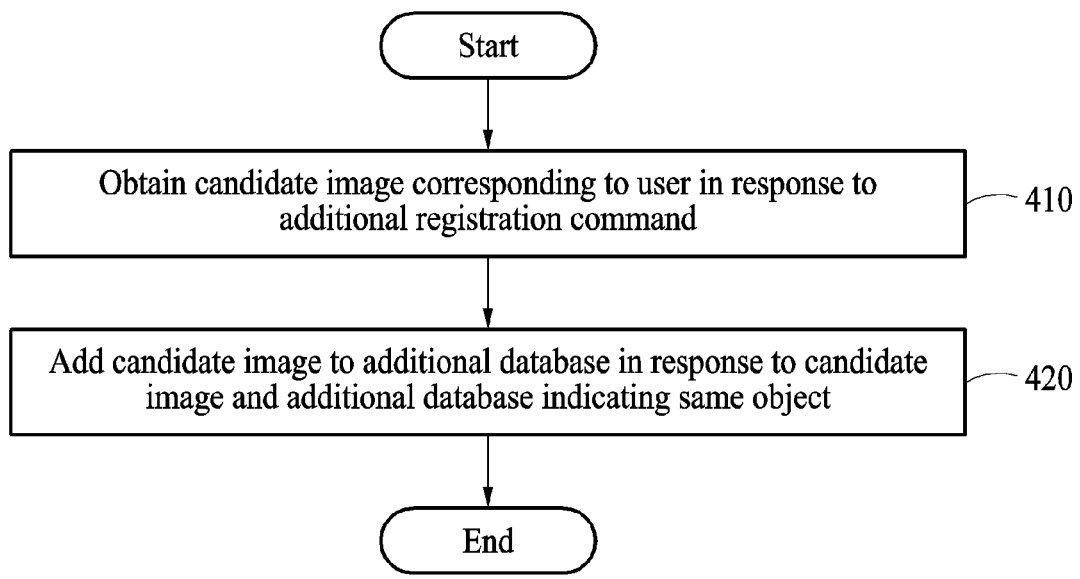
FIG. 4 is a diagram illustrating an example of a user registration method.

FIG. 4 is a diagram illustrating an example of a user registration method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, an image acquirer of a user registration device obtains a candidate image corresponding to a user in response to an additional registration command. In an example, a processor of the user registration device may generate the additional registration command in response to an input from the user. For example, the processor may generate the additional registration command in response to an input requesting additional registration being received from the user, and the image acquirer may capture the candidate image in response to the additional registration command. In addition, in response to the additional registration command being generated, the process may determine an input image captured for user recognition to be the candidate image.

In operation 420, in response to the candidate image and an additional database corresponding to the additional registration command indicating a same object, the processor adds the candidate image to the additional database. For example, the processor may determine whether an object in the candidate image is the same as an object in additional registered images stored in the additional database. When the candidate image and the additional registered images indicate the same object, the processor may update the additional database by adding the candidate image to the additional database.

In addition, when the additional database corresponding to the candidate image is absent, and the candidate image and an initial database indicating a same object, the processor may generate the additional database. For example, the processor may determine whether the object in the candidate image is the same as an object in initial images registered in the initial database. When the candidate image and the initial images indicate the same object, the processor may generate a new additional database, and thus configure a database for an image obtained in an environment different from that associated with the initial database.

FIGS. 5 through 9 are diagrams illustrating examples of user registration methods.

Figure 5:
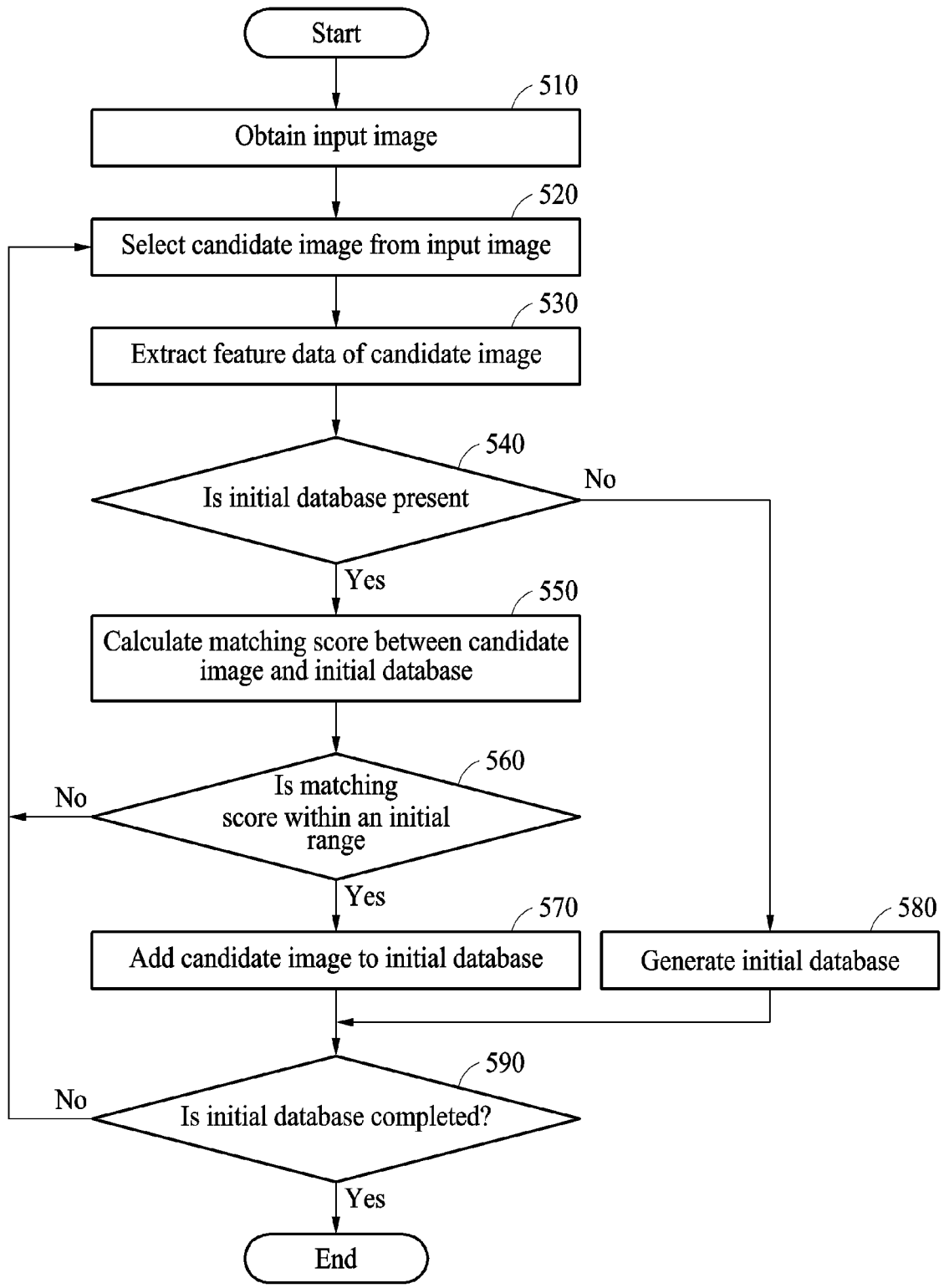
FIGS. 5 through 9 are diagrams illustrating examples of user registration methods.

FIG. 5 is a diagram illustrating an example of initially registering a user using a registration device. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the user registration device obtains an input image. The input image refers to an image input by a user. In an example, the input image is used as a candidate image to register the user. Although the input image is described as including a plurality of candidate images in the example illustrated in FIG. 5, the input image is not limited to the example, and may include a single candidate image.

In operation 520, the user registration device selects a candidate image from the input image. For example, when the input image includes a series of images, the user registration device selects one of the images to be the candidate image to be used for registration. For example, the user registration device may sequentially select a candidate image based on an order in which the images are input, or randomly select a candidate image. In an example, the user registration device may select a candidate image from the input images based on a quality of the candidate image.

In operation 530, the user registration device extracts feature data of the candidate image. Herein, feature data refers to data extracted from an image, for example, data indicating a feature abstracting the image. The user registration device may extract feature data from an image based on a feature model, for example, a deep-learning neural network. The feature model may be of a machine learning structure, and trained to output reference feature data from a reference image. In a case of the feature model being configured in a neural network structure, the feature model may include a connection weight among nodes in a neural network as parameters of the machine learning structure. The reference feature data may be data specified as ground truth with respect to the reference image.

In operation 540, the user registration device determines whether an initial database is present.

In operation 550, when the initial database is present, the user registration device calculates a matching score between the candidate image and the initial database. For example, the user registration device may calculate a matching score between the candidate image and an initial image registered in the initial database. For example, when n initial images are registered in the initial database, the user registration device may compare the candidate image and each of the n initial images and obtain n matching scores, where n denotes an integer greater than or equal to 1.

The matching score refers to a score indicating a similarity between two images.

In operation 560, the user registration device determines whether the matching score is in an initial range. The initial range refers to a reference range used to determine whether the candidate image, which is a target, and the initial image are similar to each other. In an example, the initial range is defined as a range from an initial minimum threshold to an initial maximum threshold.

In one example, in response to the matching score being greater than the initial minimum threshold and being less than the initial maximum threshold, the user registration device may determine that the matching score is in the initial range. However, in response to the matching score being less than or equal to the initial minimum threshold, or being greater than or equal to the initial maximum threshold, the user registration device may determine that the matching score is out of the initial range.

In operation 570, the user registration device adds, to the initial database, the candidate image when the matching score is in the initial range. For example, when n matching scores are obtained and all the n matching scores are in the initial range, the user registration device may add the candidate image to the initial database. However, examples are not limited to the example described in the foregoing, and the user registration device may add the candidate image to the initial database in a case in which at least one of the n matching scores is in the initial range.

In an example, the user registration device excludes a candidate image when a matching score is out of the initial range. For example, the user registration device may exclude the candidate image when the matching score is less than or equal to the initial minimum threshold from being registered in the initial database, and add only a candidate image similar to the initial image that is already registered. In addition, the user registration device may exclude the candidate image when the matching score is greater than or equal to the initial maximum threshold from being registered in the initial database and add, to the initial database, the candidate image distinguished from the initial image that is already registered.

Thus, the user registration device may acquire various initial images that are similar to each other.

In operation 580, when the initial database is not present, the user registration device generates the initial database. In such a case, the candidate image selected in operation 520 may be used as a reference image in an initial registration process.

In operation 590, the user registration device determines whether the initial database is completed. For example, when a plurality of input images is obtained in operation 510, the user registration device may return to operation 520, and repeat operations 530 through 580 for remaining candidate images.

In an example, when the number of initial images registered in the initial database reaches an initial maximum number, the user registration device may terminate initial registration. In addition, when the user registration device determines whether to add, to the initial database, all the candidate images included in the input image, the user registration device may terminate the initial registration.

A maximum number used herein refers to a maximum number of sets of data that is specified or allowed to be registered in each database. For example, the initial maximum number refers to a maximum number of sets of data that is specified or allowed to be registered in the initial database. For example, in a case of the initial maximum number being specified as M, the user registration device may register M initial images, to the maximum, in the initial database for a user. Herein, the user registration device may store each of the initial images in a form of feature data. The maximum number and the initial maximum number may be, for example, 30, but not limited thereto.

Figure 6:
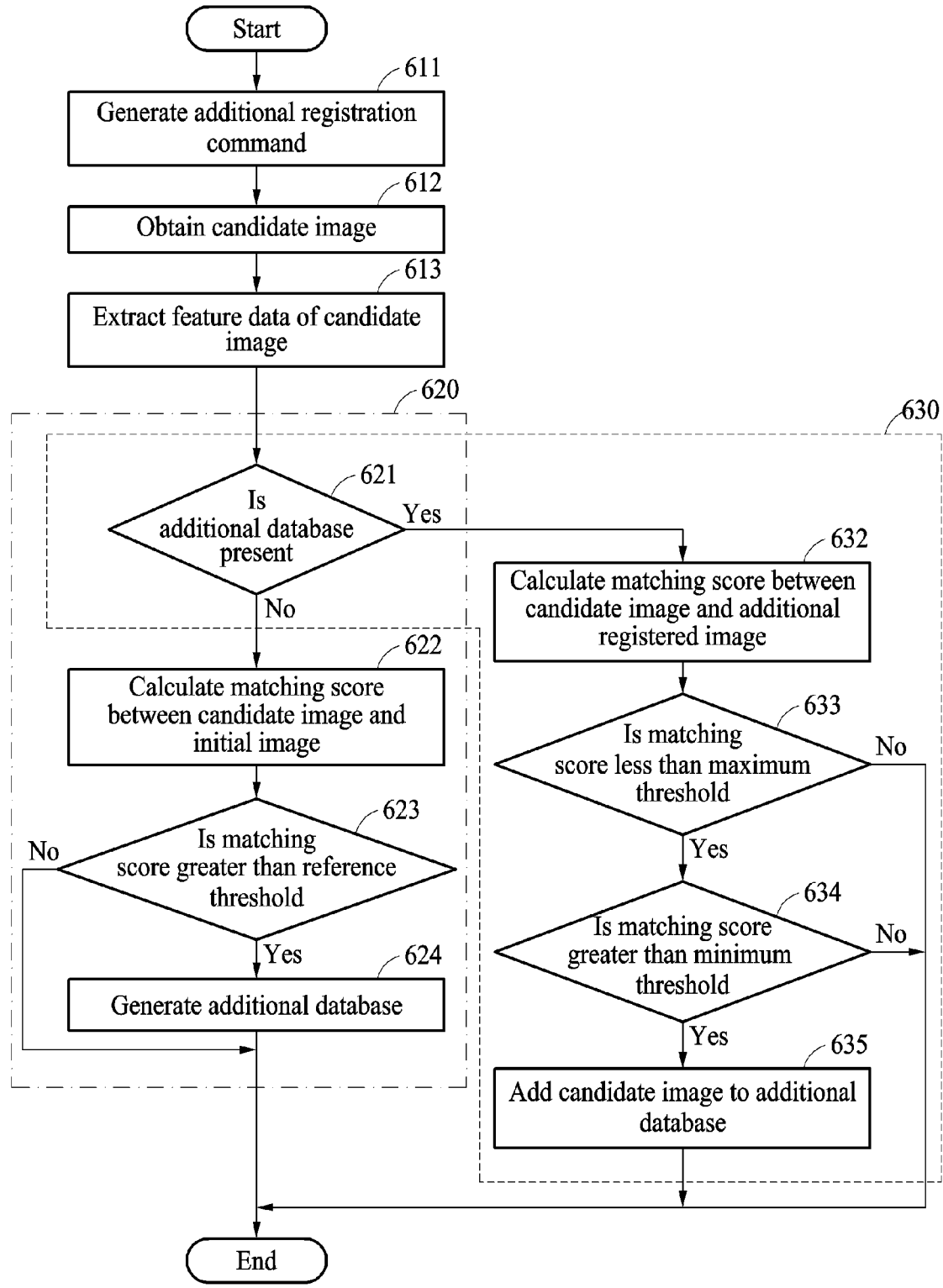

FIG. 6 is a diagram illustrating an example of generating and managing an additional database using a user registration device. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 611, the user registration device generates an additional registration command. For example, the user registration device may generate the additional registration command in response to a user input being received from a user. However, the generating of the additional registration command is not limited to the example described in the foregoing, and in another example, the additional registration command may also be generated when the user registration device determines that additional registration is needed.

In an example, when user recognition fails for a number of times or more, the user registration device may provide the user with an interface recommending additional registration. The user registration device may generate the additional registration command in response to a user input received through the interface.

For example, when user recognition is attempted in an environment different from an environment in which initial registration is performed, for example, in a dark environment, and the user recognition fails several times, the user registration device may recommend the additional registration to the user, or generate the additional registration command. When the user recognition fails frequently with a certain attribute, for example, when the user wears eyeglasses and it is dark around the user, the user registration device may recommend the user to perform the additional registration with the attribute. The user registration device may identify the attribute which causes the user recognition to fail. The user registration device may provide an interface recommending generation of an additional database for the identified attribute. For example, when user recognition fails a number of times or more in a dark environment, the user registration device may provide the user with an interface recommending generation of an additional database for the dark environment.

In other examples, the user registration device may generate the additional registration command based on other inputs, such as, for example, biometric data recognition and a user input. The biometric data recognition may include, for example, fingerprint recognition and iris recognition. The user input may include, for example, pattern recognition.

For example, the user registration device may obtain at least one of biometric data or a user input from the user. When the at least one of the biometric data recognition or the user input is valid, the user registration device may generate the additional registration command.

The user registration device may request a pattern input, as an example of the user input, from the user. When a pattern input by the user is the same as a registered pattern, the user registration device may generate the additional registration command. The pattern may be, for example, a trace or a trajectory formed by successive touch inputs applied onto a display of the user registration device, or a password input by the user through a series of user inputs.

The user registration device may request fingerprint recognition, as an example of the biometric data recognition, from the user. When an input fingerprint received from the user matches a registered fingerprint, the user registration device may generate the additional registration command. The registered fingerprint may be mapped to an initial database corresponding to a registered user.

The user registration device may request iris recognition, as another example of the biometric data recognition, from the user. The user registration device may obtain an input iris image of the user. The user registration device may obtain an input image of the user along with the input iris image of the user. The user registration device may generate the additional registration command based on comparing the input iris image and a registered iris image. When the input iris image matches the registered iris image, the user registration device may generate the additional registration command. In an example, an iris image is an infrared ray (IR) image obtained by capturing an image of a human iris. In response to the additional registration command being generated based on the iris recognition, the user registration device may determine, from the input image, a candidate image corresponding to the input iris image.

In operation 612, the user registration device obtains a candidate image. For example, the user registration device may obtain the candidate image including an object by capturing an image of at least a portion of the user.

In operation 613, the user registration device extracts, from the candidate image, feature data corresponding to the candidate image. For example, the user registration device may output the feature data by inputting the candidate image to a feature model trained in advance.

In operation 620, the user registration device generates an additional database.

For example, in operation 621, the user registration device determines whether the additional database is present.

In operation 622, when the additional database is not present, the user registration device calculates a matching score by comparing the candidate image and an initial image stored in an initial database. For example, when a plurality of initial images is stored in the initial database, the user registration device may calculate a matching score between the candidate image and each of the initial images.

In an example, the user registration device extracts, from the initial database, feature data corresponding to the initial image. When the initial image is registered in a form of feature data in the initial database, the user registration device may load the initial image in the form of feature data. In an example, the user registration device calculates a similarity between the feature data corresponding to the candidate image and the feature data corresponding to the initial image. In an example, the similarity between the feature data corresponding to the candidate image and the feature data corresponding to the initial image may be the matching score.

In operation 623, the user registration device determines whether the matching score exceeds a reference threshold. In an example, in response to the matching score exceeding the reference threshold, the user registration device may determine that an object in the candidate image and an object in the initial image are a same object. In response to the matching score being less than or equal to the reference threshold, the user registration device may determine that the object in the candidate image differs from an object indicated by the initial database. Herein, the reference threshold refers to a threshold used to indicate how similar the candidate image and the initial image are.

When the matching score is calculated for each of the plurality of the initial images, the user registration device may determine whether at least one of the obtained matching scores exceeds the reference threshold. For example, when the candidate image is similar to at least one of the initial images, the user registration device may determine that the object indicated by the initial database and the object indicated by the candidate image are the same object. However, examples are not limited to the example described in the foregoing, and in another example, the user registration device may determine that the object indicated by the initial database and the object indicated by the candidate image are the same object when the candidate image is similar to a threshold number of initial images or more that corresponds to a threshold proportion of the total number of the initial images stored in the initial database.

In operation 624, in response to the candidate image and the initial database indicating the same object, the user registration device generates the additional database. For example, the user registration device may determine whether to generate the additional database corresponding to the candidate image based on the obtained matching score. In response to the matching score exceeding the reference threshold, the user registration device may generate the additional database including the candidate image. In an example, the user registration device may generate the additional database corresponding to the candidate image. For example, the user registration device may generate the additional database and register the candidate image in the additional database.

In operation 630, the user registration device adds the candidate image to the additional database. For example, when the candidate image and an additional registered image stored in the additional database are similar to each other in response to the additional database being present, the user registration device may add the candidate image to the additional database.

For example, in operation 632, in response to the additional database being present, the user registration device calculates a matching score by comparing the candidate image and the additional registered image. Herein, when a plurality of additional registered images is stored in the additional database, the user registration device may calculate a matching score between the candidate image and each of the additional registered images. The user registration device may extract, from the candidate image, the feature data corresponding to the candidate image. The user registration device may also extract, from the additional registered image, feature data corresponding to the additional registered image. The user registration device may calculate a similarity between the feature data corresponding to the candidate image and the feature data corresponding to the additional registered image. Herein, when the additional registered image is stored in a form of feature data in the additional database, the user registration device may load the feature data and use the loaded feature data to calculate the matching score, for example, the similarity.

In an example, the user registration device may determine whether to add the candidate image to the additional database based on the obtained matching score. The user registration device may determine whether the matching score is in a reference range. For example, in operation 633, the user registration device determines whether the matching score is less than a maximum threshold. When the matching score is greater than or equal to the maximum threshold, the user registration device determines that the matching score is out of the reference range. In operation 634, the user registration device determines whether the matching score exceeds a minimum threshold. When the matching score is less than or equal to the minimum threshold, the user registration device determines that the matching score is out of the reference range. When the matching score is less than the maximum threshold and exceeding the minimum threshold, the user registration device determines that the matching score is in the reference range.

In operation 635, in response to the matching score being in the reference range, the user registration device adds the candidate image to the additional database.

In addition, when the matching score is out of the reference range, the user registration device determines that the candidate image and the additional registered image are not similar to each other. In response to a determination that the candidate image and the additional registered image are not similar to each other, the user registration device excludes the candidate image from additional registration.

For example, the user registration device may store an initial database associated with a face of the user onto which makeup is not applied. The user registration device may generate, from the initial database, a first additional database associated with a face of the user onto which light makeup is applied. In addition, the user registration device may generate, from the first additional database, a second additional database associated with a face of the user onto which heavy makeup is applied. Thus, although the face onto which the heavy makeup is applied and the face onto which makeup is not applied are not similar to each other, the user registration device may apply gradual registration. Thus, through such a gradual registration, the user registration device may generate and manage databases associated with various environments and aspects of the user.

Figure 7:
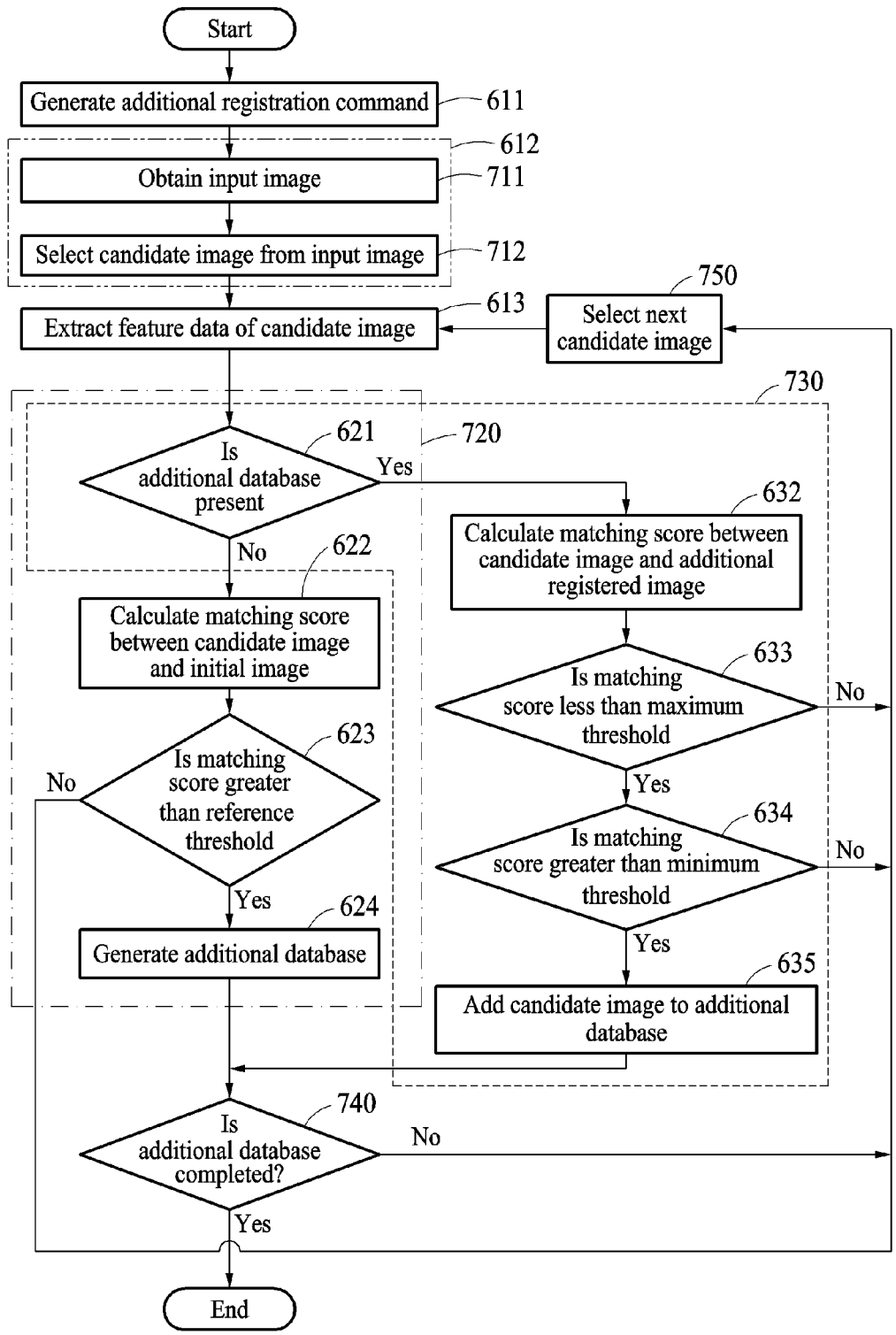

FIG. 7 is a diagram illustrating an example of generating and managing an additional database using an input image including a plurality of candidate images using a user registration device. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Specifically, the description for the operations in FIG. 6, which have the same reference numbers as the reference numbers illustrated in FIG. 7, are incorporated by reference in the description for FIG. 7. Thus, the above description may not be repeated here.

Referring to FIG. 7, in operation 611, the user registration device generates an additional registration command. In operation 612, the user registration device selects a candidate image from an input image. For example, in operation 711, the user registration device obtains the input image including a plurality of object images of an object corresponding to a user. In operation 712, the user registration device selects the candidate image from the input image. In operation 613, the user registration device extracts feature data from the candidate image.

The user registration device performs operations 621, 622, 623, 624, 632, 633, 634, and 635 using the candidate image selected in operation 712. For example, the user registration device generates an additional database using the candidate image in operation 720, and adds the candidate image to the additional database in operation 730.

In operation 740, the user registration device determines whether the additional database is completed. For example, the user registration device may determine whether a number of additional registered images stored in the additional database have reached a maximum number. When the number of the additional registered images stored in the additional database is less than the maximum number, the user registration device may add the candidate image to the additional database.

In operation 750, the user registration device selects a next candidate image. For example, in operation 623, in response to a matching score between the candidate image and an initial image being less than or equal to a reference threshold, the user registration device may select the next candidate image in operation 750. In operations 633 and 634, when a matching score between the candidate image and an additional registered image is out of a reference range, the user registration device may select the next candidate image in operation 750. Further, when it is determined in operation 740 that the additional database is not completed, the user registration device may select the next candidate image in operation 750.

The user registration device may determine whether to generate or add the additional database in operations 720 and 730, using the next candidate image selected in operation 750. The user registration device may perform operations 720 and 730 on all the candidate images included in the input image.

In operation 740, when it is determined that the additional database is completed, the user registration device terminates additional registration. When the additional database is completed, the user registration device determines whether to update the additional database using the candidate image to be input. For example, when the number of the additional registered images is greater than or equal to the maximum number, the user registration device may determine whether to update, using the candidate image, one of the additional registered images stored in the additional database.

Figure 8:
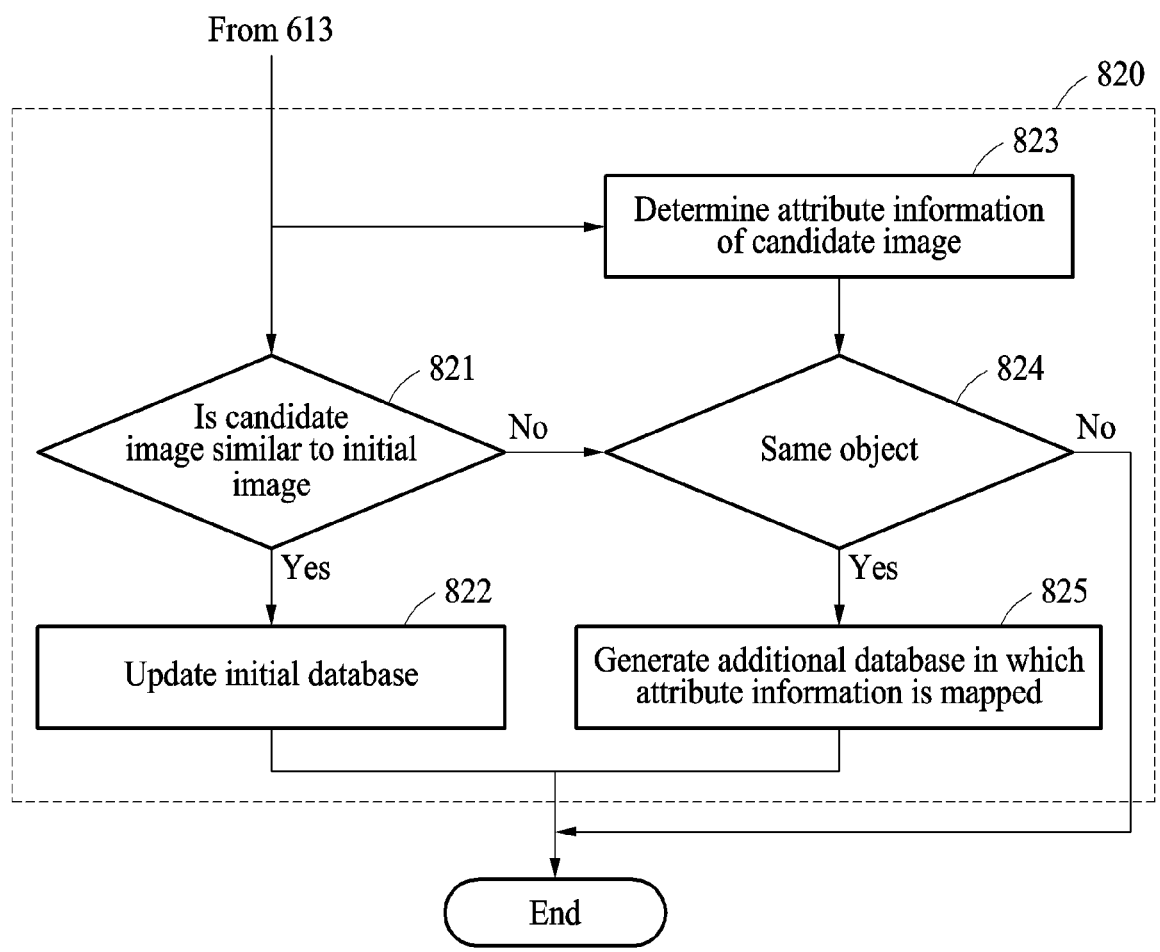

FIG. 8 is a diagram illustrating an example of managing an additional database by mapping attribute information using a user registration device. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 820, the user registration device determines whether to generate an additional database based on attribute information of a candidate image.

In operation 821, the user registration device determines whether the candidate image is similar to an initial image that is initially registered. For example, the user registration device may calculate a matching score between the candidate image and the initial image, and determine whether the obtained matching score exceeds a reference threshold.

In operation 822, when it is determined that the candidate image is similar to the initial image stored in an initial database, the user registration device updates the initial database using the candidate image. For example, the user registration device may replace, with the candidate image, one of initial images registered in the initial database.

In operation 823, the user registration device determines the attribute information of the candidate image. The user registration device may determine the attribute information such as, for example, an environment in which the candidate image is captured, an accessory (e.g., eyeglasses) attached to an object (e.g., a face of a user), and an amount of makeup applied to an object (e.g., a face of a user) in the candidate image. In an example, the user registration device determines the attribute information of the candidate image using a machine learning structure, for example, a neural network. In an example, the user registration device receives, from the user, an attribute specifying input, and determines an attribute corresponding to the received attribute specifying input to be the attribute information of the candidate image.

In operation 824, the user registration device determines whether an object in the candidate image and an object in the initial image are a same object. In an example, the user registration device may determine whether a user registered in the initial database and a user attempting a current additional registration are a same user. Thus, through such an auxiliary verifying operation, the user registration device may determine whether the user of the initial image and the user of the candidate image are the same user. The auxiliary verifying operation may include processes such as, for example, fingerprint registration, pattern registration, and iris registration.

For example, the user registration device may request a pattern input from the user. When an input pattern received from the user is the same as a registered pattern, the user registration device may determine that the object in the initial image and the object in the candidate image are the same object.

For another example, the user registration device may request fingerprint recognition from the user. When an input fingerprint received from the user matches a registered fingerprint, the user registration device may determine that the object in the initial image and the object in the candidate image are the same object.

For still another example, the user registration device may request iris recognition from the user. The user registration device may obtain an input iris image of the user. The user registration device may determine whether the candidate image and the initial database indicate the same object based on a result of comparing the input iris image and a registered iris image. When the input iris image received from the user matches the registered iris image, the user registration device may determine that the object in the candidate image and the object in the initial image are the same object.

In an example, the use registration device may generate an additional registration command by verifying whether a current user is a registered user. In response to the additional registration command, the user registration device may verify the user once again through the fingerprint recognition, the pattern recognition, the iris recognition, and the like to additionally register a new candidate image. Thus, the user registration device may prevent other users from being registered, while reducing a recognition failure.

Further, the user registration device may determine whether the object in the candidate image and the object in the initial image are the same object based on a matching score between the candidate image and the initial image, in addition to at least one of the fingerprint recognition, the pattern recognition, or the iris recognition. For example, when at least one of the fingerprint recognition, the pattern recognition, or the iris recognition is successful, and the matching score between the candidate image and the initial image exceeds an additional threshold, the user registration device may determine that the objects in the two images are the same object. Herein, the additional threshold refers to a threshold used to determine whether objects in two images obtained in different environments are a same object, and may be set to be a value less than the reference threshold.

In operation 825, the user registration device generates an additional database in which the attribute information of the candidate image is mapped. For example, when it is determined that the object in the candidate image and the object in the initial image are the same object, the user registration device may generate the additional database, for example, an attribute database, in which the attribute information is mapped, and register the candidate image in the attribute database.

In addition, when it is determined that the object in the candidate image and the object in the initial image are not the same object, the user registration device may exclude the candidate image from additional registration.

In an example, the user registration device may store a database for an additional face having other attribute information, in addition to a database for an existing face of the same user, and thus reduce a recognition failure.

Figure 9:
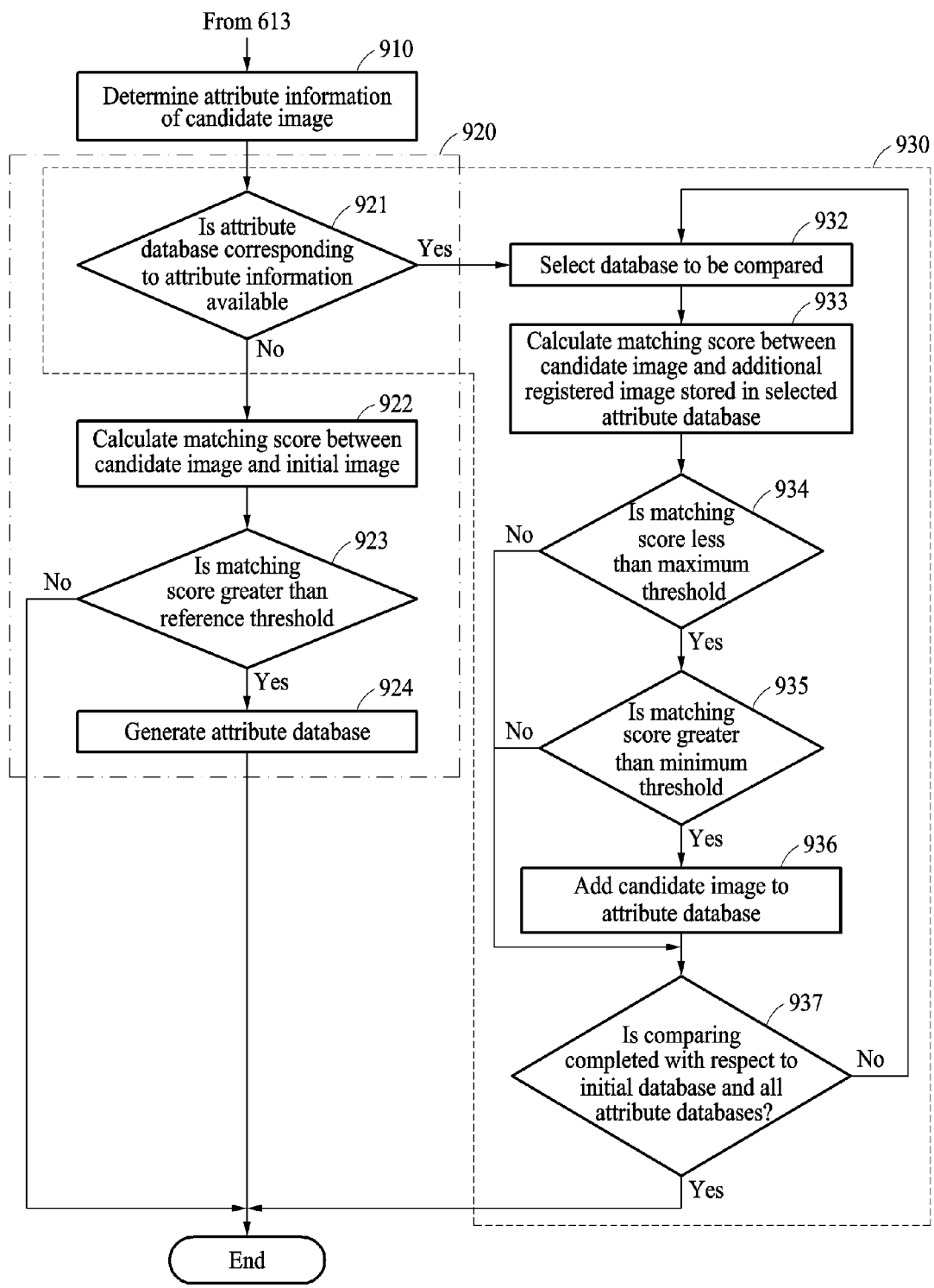

FIG. 9 is a diagram illustrating an example additionally registering a candidate image when there is a plurality of attribute databases using a user registration device. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, in operation 910, the user registration device determines attribute information of a candidate image.

In operation 920, the user registration device generates an attribute database.

For example, in operation 921, the user registration device determines whether an attribute database corresponding to the attribute information is present.

In operation 922, when it is determined that the attribute database corresponding to the attribute information is not present, the user registration device calculates a matching score between the candidate image and an initial image.

In operation 923, the user registration device determines whether the matching score exceeds a reference threshold. When the matching score is less than or equal to the reference threshold, the use registration device may not generate the attribute database based on the candidate image.

In operation 924, when the matching score exceeds the reference threshold, the user registration device generates the attribute database. For example, the user registration device may generate the attribute database corresponding to the attribute information of the candidate image, and register the candidate image in the generated attribute database.

In operation 930, the user registration device determines whether to add the candidate image to the attribute database. In an example, when it is determined that the attribute database corresponding to the attribute information is present, the user registration device may compare the candidate image and an attribute image stored in the attribute database. When the candidate image and the attribute image are similar to each other, the user registration device may add the candidate image to the attribute database.

For example, in operation 932, the user registration device selects a database to be compared to the candidate image. When a plurality of attribute databases is available, the user registration device may select one attribute database from the attribute databases. In addition, the user registration device may select one from an initial database and the attribute databases.

In operation 933, the user registration device calculates a matching score between the candidate image and an additional registered image in the selected attribute database. Herein, an additional registered image stored in an attribute database is also referred to as an attribute image. For example, the user registration device may compare the candidate image and an attribute image stored in the selected attribute database.

In operation 934, the user registration device determines whether the matching score is less than a maximum threshold. When the matching score is greater than or equal to the maximum threshold, the user registration device excludes the candidate image from being additionally registered in the selected attribute database. Thus, the user registration device may prevent same or similar images from being included in different attribute databases.

In operation 935, the user registration device determines whether the matching score exceeds a minimum threshold. When the matching score is less than or equal to the minimum threshold, the user registration device excludes the candidate image from being additionally registered in the selected attribute database. Thus, the user registration device may prevent different images or nonsimilar images from being included in each of the attribute databases.

In an example, the user registration device changes the reference threshold to be compared to the matching score, based on an attribute. For example, when the attribute information of the candidate image and attribute information of the attribute image are the same, the user registration device may increase the minimum threshold to be used to compare the candidate image and the attribute image. Because the matching score tends to increase when the attribute information of the candidate image and the attribute image of the attribute image are the same, the user registration device may increase the minimum threshold to more accurately determine whether an object in the candidate image and an object in the attribute image are a same object. Also, when the attribute information of the candidate image and the attribute information of the attribute image are different from each other, the user registration device may decrease the minimum threshold to be used to compare the candidate image and the attribute image. Because the matching score tends to decrease when the attribute information of the candidate image and the attribute information of the attribute image are different from each other, the user registration device may decrease the minimum threshold to more accurately determine whether the object in the candidate image and the object in the attribute image are the same object.

In operation 936, when the candidate image and the attribute image being similar to each other, the user registration device adds the candidate image to the selected attribute database. For example, when it is determined that the object in the candidate image and the object in the attribute image are the same object, the user registration device may add the candidate image to the selected attribute database.

In operation 937, the user registration device determines whether the comparing is completed with respect to the initial database and all the attribute databases. For example, the user registration device may determine whether to add the candidate image to another remaining attribute database of the attribute databases. In addition, the user registration device may determine whether to add the candidate image to the initial database. However, examples are not limited to the example described in the foregoing, and the user registration device may determine whether the comparing is completed with respect to the initial database and at least one of the attribute databases.

Figure 10:
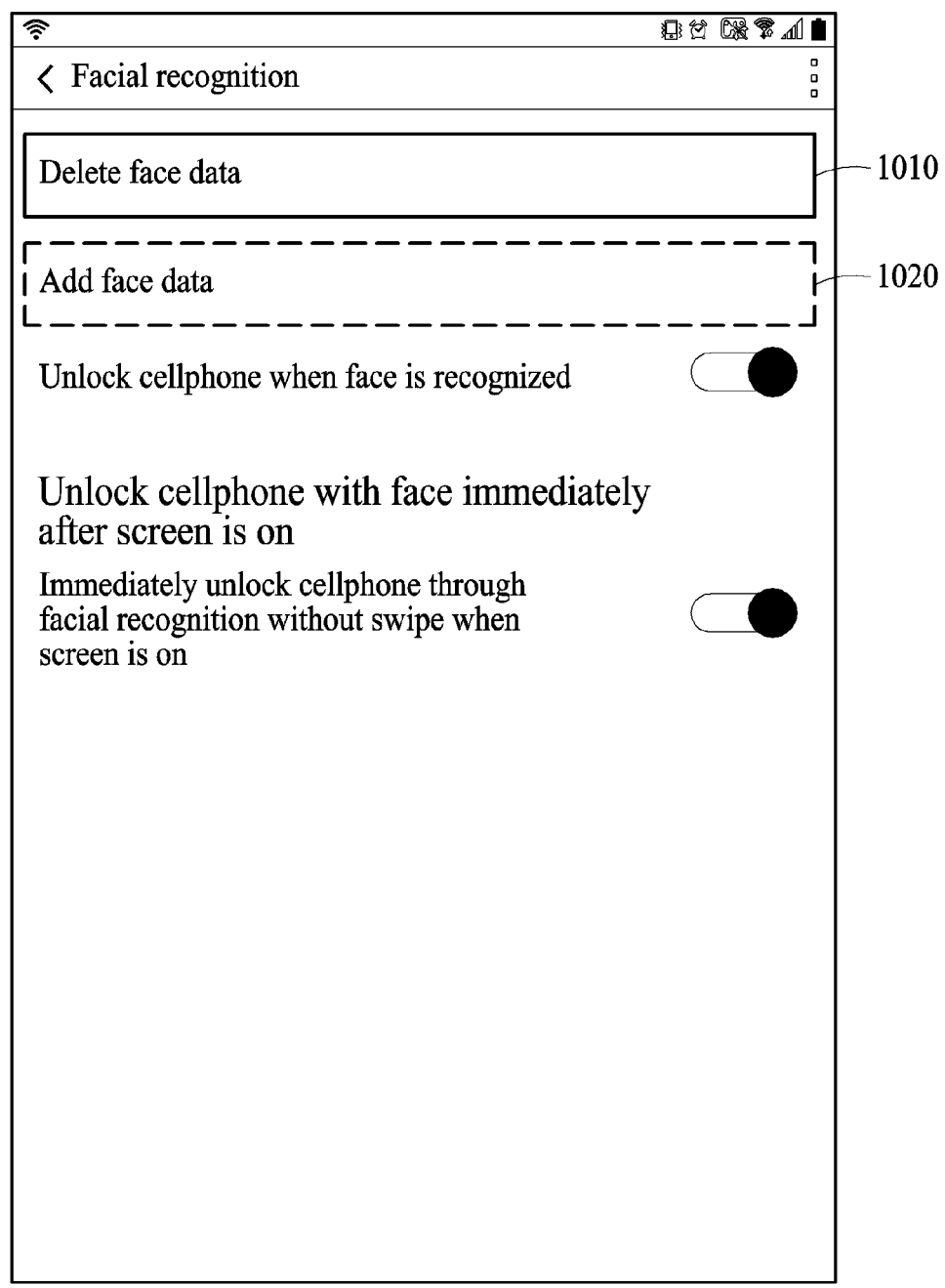
FIG. 10 is a diagram illustrating an example of an interface screen of a user registration device.

FIG. 10 is a diagram illustrating an example of an interface screen of a user registration device.

Referring to FIG. 10, the user registration device provides an interface 1000 for additional registration. For example, as illustrated, the interface 1000 provides a face data deleting operation 1010 and a face data adding operation 1020. When the face data deleting operation 1010 is activated by a user input, the user registration device deletes face data of a registered user. When the face data adding operation 1020 is activated by a user input, the user registration device starts performing the additional registration described with reference to FIGS. 1 through 9 for a registered user.

The operations described above with reference to FIGS. 1 through 10 may be performed in an order different from the described order. For example, although it is described that an additional registration command is generated in operation 611 and a candidate image is obtained in operation 612 with reference to FIGS. 6 and 7, examples are not limited to the example described in the foregoing. The user registration device may obtain first the candidate image, and then generate the additional registration command. Also, similarly to what is described in operations 611 and 824, the user registration device may generate the additional registration command by performing iris recognition, thereby performing an auxiliary verifying operation to determine whether to add the candidate image to an additional database. Hereinafter, how the operations are performed in the changed order as described in the foregoing will be described.

Figure 11:
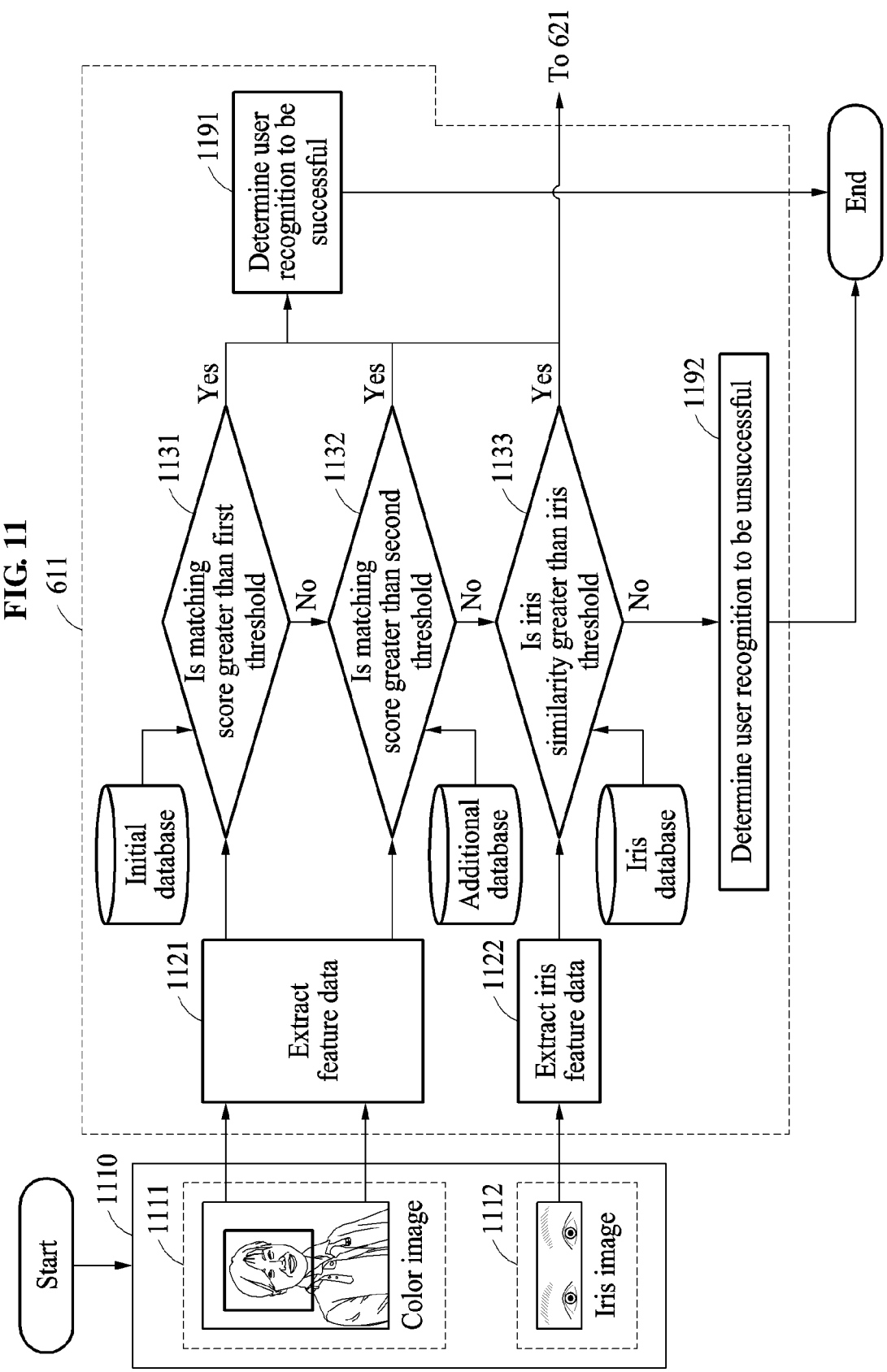
FIG. 11 is a diagram illustrating an example of generating an additional registration command.

FIG. 11 is a diagram illustrating another example of how a user registration device generates an additional registration command. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

In an example, as illustrated in FIG. 11, the user registration device may determine whether to register, in an additional database, an input image obtained in a user recognition process based on a result of iris recognition.

Referring to FIG. 11, in operation 1110, the user registration device obtains input data to be used for user recognition. For example, the user registration device obtains a candidate image (e.g., a color image) in operation 1111, and an input iris image in operation 1112. In an example, the candidate image and the input iris image is obtained together. The user registration device may obtain the candidate image and the input iris image, and thus minimize user inputs or user manipulations that may be required for the user recognition and additional registration.

In operation 611, the user registration device generates an additional registration command. In response to a result of the user recognition based on the candidate image and the input iris image, the user registration device determines whether to generate the additional registration command.

For example, in operation 1121, the user registration device extracts feature data from the candidate image. Using the feature data, the user registration device calculates a matching score between the candidate image and an initial image registered in an initial database.

In operation 1131, the user registration device determines whether the matching score exceeds a first threshold. When the matching score exceeds the first threshold, the user registration device determines that the user recognition is successful in operation 1191. When the matching score is less than or equal to the first threshold, in operation 1132, the user registration device compares the matching score and a second threshold. When the matching score exceeds the second threshold, in operation 1191, the user registration device determines that the user recognition is successful. In an example, the second threshold may be set to be a greater value than the first threshold, but is not limited thereto.

In addition, when the matching score is less than or equal to the second threshold, the user registration device determines whether to generate the additional registration command based on the iris recognition.

For example, in operation 1122, the user registration device extracts iris feature data. Using the iris feature data, the user registration device calculates an iris similarity between the input iris image and a registered iris image. In addition, the user registration device extracts feature data corresponding to the registered iris image from an iris database, and calculates the iris similarity between the input iris image and the registered iris image.

In operation 1133, the user registration device compares the obtained iris similarity and an iris threshold. For example, the user registration device may determine whether the iris similarity exceeds the iris threshold.

When the iris similarity is less than or equal to the iris threshold, in operation 1192, the user registration device determines that the user recognition is unsuccessful.

When the iris similarity exceeds the iris threshold, the user registration device generates the additional registration command. In response to the additional registration command, the user registration device determines whether an additional database is present in operation 621.

As described above, although the user registration device fails in the user recognition using the candidate image obtained in operation 1110, the user registration device may perform the auxiliary verifying operation, for example, operation 824 described with reference to FIG. 8, based on the input iris image obtained along with the candidate image in operation 1110, and thus determine whether to register the candidate image in the additional database. Thus, the user registration device may determine whether to add the candidate image to the additional database using the candidate image and the input iris image obtained together in operation 1110, and thus may minimize user inputs and user manipulations required for the user recognition and the additional registration. In an example, the user registration device may generate an additional database without an additional input or manipulation after the user recognition, or add a candidate image to the additional database, thereby maximizing user convenience.

The user registration device, user registration device 110, user registration device 200, and other apparatuses, units, modules, devices, and other components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A user registration method comprising:
    obtaining a candidate image corresponding to a user, in response to an additional registration command; and
    adding the candidate image to an additional database, in response to the candidate image and the additional database corresponding to the additional registration command indicating a same object,
    wherein the adding of the candidate image comprises:
    calculating a matching score by comparing the candidate image and an additional registered image stored in the additional database; and
    determining whether to add the candidate image to the additional database based on the matching score, and wherein the determining of whether to add the candidate image to the additional database comprises:
adding the candidate image to the additional database, in response to the matching score being in a reference range; and
determining that the candidate image and the additional registered image are not similar to each other, in response to the matching score being out of the reference range.

2. The user registration method of claim 1, further comprising:
obtaining at least one of biometric data or a user input from the user; and
generating the additional registration command, in response to the at least one of the biometric data being recognized or the user input being valid.

3. A user registration method comprising:
obtaining a candidate image corresponding to a user, in response to an additional registration command; and
adding the candidate image to an additional database, in response to the candidate image and the additional database corresponding to the additional registration command indicating a same object, wherein the method further comprises:
obtaining an input image of the user and an input iris image of the user; and
generating the additional registration command, in response to the input iris image matching a registered iris image,
wherein the obtaining of the candidate image comprises:
determining the input image corresponding to the input iris image to be the candidate image, in response to the additional registration command being generated.

4. A user registration method comprising:
obtaining a candidate image corresponding to a user, in response to an additional registration command; and
adding the candidate image to an additional database, in response to the candidate image and the additional database corresponding to the additional registration command indicating a same object, wherein the method further comprises:
providing an interface recommending additional registration, in response to user recognition failing for more than a threshold number of times or more; and
generating the additional registration command, in response to a user input being received through the interface.

5. The user registration method of claim 4, wherein the providing of the interface recommending the additional registration comprises:
identifying an attribute causing the user recognition to fail; and
providing an interface recommending generation of an additional database for the identified attribute.

6. A user registration method comprising:
obtaining a candidate image corresponding to a user, in response to an additional registration command; and
adding the candidate image to an additional database, in response to the candidate image and the additional database corresponding to the additional registration command indicating a same object, wherein the method further comprises:
generating the additional database corresponding to the additional registration command, in response to the additional database corresponding to the additional registration command being absent and the candidate image and an initial image stored in an initial database being similar to each other.

7. The user registration method of claim 1, wherein the obtaining of the candidate image comprises:
obtaining an input image comprising images of an object corresponding to the user; and
selecting the candidate image from the input image.

8. The user registration method of claim 6, wherein the generating of the additional database comprises:
calculating a matching score by comparing the candidate image and the initial image stored in the initial database; and
determining whether to generate the additional database corresponding to the candidate image based on the matching score.

9. The user registration method of claim 8, wherein the determining of whether to generate the additional database comprises:
generating the additional database comprising the candidate image, in response to the matching score exceeding a reference threshold; and
determining that the candidate image indicates an object different from an object indicated by the initial database, in response to the matching score being less than or equal to the reference threshold.

10. The user registration method of claim 8, wherein the calculating of the matching score comprises:
extracting, from the candidate image, feature data corresponding to the candidate image;
extracting, from the initial database, feature data corresponding to the initial image; and
calculating a similarity between the feature data corresponding to the candidate image and the feature data corresponding to the initial image.

11. The user registration method of claim 6, further comprising:
determining attribute information of the candidate image,
wherein the generating of the additional database comprises generating a database in which the attribute information of the candidate image is mapped.

12. The user registration method of claim 11, wherein the adding of the candidate image comprises:
comparing the candidate image and an attribute image stored in an attribute database, in response to the attribute database corresponding to the attribute information being present; and
adding the candidate image to the attribute database, in response to the candidate image and the attribute image being similar.

13. The user registration method of claim 11, further comprising:
selecting an attribute database from the plurality of attribute databases, in response to a presence of the plurality of attribute databases;
comparing the candidate image and an attribute image stored in the selected attribute database;
adding the candidate image to the selected attribute database, in response to the candidate image and the attribute image being similar; and
determining whether to add the candidate image to a remaining attribute database of the plurality of attribute databases.

14. The user registration method of claim 13, wherein the comparing of the candidate image and the attribute image comprises:
increasing a minimum threshold to compare the candidate image and the attribute image, in response to the attribute information of the candidate image and attribute information of the attribute image being the same; and decreasing the minimum threshold to compare the candidate image and the attribute image, in response to the attribute information of the candidate image and the attribute information of the attribute image being different from each other.

15. A user registration method comprising:

obtaining a candidate image corresponding to a user, in response to an additional registration command; and adding the candidate image to an additional database, in response to the candidate image and the additional database corresponding to the additional registration command indicating a same object, wherein the method further comprises:

performing user recognition based on an input image of the user; and updating the initial database with the candidate image, in response to the candidate image selected from the input image being similar to an initial image stored in an initial database.

16. The user registration method of claim 1, wherein the adding of the candidate image comprises:

adding the candidate image to the additional database, in response to a number of additional registered images stored in the additional database being less than a maximum number.

17. A non-transitory computer-readable storage medium storing instructions that, when executed by a processor, cause the processor to perform the user registration method of claim 1.

18. A user registration device comprising:

an image acquirer configured to obtain a candidate image corresponding to a user, in response to an additional registration command;

a processor configured to add the candidate image to an additional database corresponding to the additional registration command, in response to the candidate image and the additional database indicating a same object; and a memory configured to store the additional database, wherein the processor is further configured to:

calculate a matching score by comparing the candidate image and an additional registered image stored in the additional database;

add the candidate image to the additional database, in response to the matching score being in a reference range; and determine that the candidate image and the additional registered image are not similar to each other, in response to the matching score being out of the reference range.

19. A user registration method comprising:

obtaining a candidate image based on capturing a portion of a user, in response to an additional registration command;

extracting feature data from the candidate image;

calculating, based on the feature data, a matching score between the candidate image and a registered image, in response to a presence of an additional database comprising the registered image; and adding the candidate image to the additional database, in response to the matching score being greater than a minimum threshold and lesser than a maximum threshold.

20. The user registration method of claim 19, wherein the additional database corresponds to an attribute of the candidate image.

21. The user registration method of claim 19, further comprising generating the additional registration command, in response to a pattern input by a user matching a registered pattern.

22. The user registration method of claim 19, the adding of the candidate image to the additional database comprises adding the candidate image to the additional database, in response to a number of images registered in the additional database being less than a threshold.

* * * * *